United States Patent
Ballard et al.

(10) Patent No.: US 6,397,041 B1
(45) Date of Patent: May 28, 2002

(54) BROADCAST MONITORING AND CONTROL SYSTEM

(75) Inventors: John Ballard, Los Altos Hills, CA (US); John Goodman, Alexandria, VA (US)

(73) Assignee: Radio Propagation Services, Inc., Los Altos, CA (US)

( * ) Notice: Subject to any disclaimer, the term of this patent is extended or adjusted under 35 U.S.C. 154(b) by 0 days.

(21) Appl. No.: 09/469,755

(22) Filed: Dec. 22, 1999

(51) Int. Cl.[7] ............................................... H04B 17/00
(52) U.S. Cl. ................... 455/67.1; 455/67.3; 455/226.1
(58) Field of Search .......................... 455/67.1, 67.3, 455/67.4, 63, 115, 135, 136, 500, 522, 226.1, 226.2, 226.3, 226.4, 69; 375/214, 215

(56) References Cited

U.S. PATENT DOCUMENTS

| | | | |
|---|---|---|---|
| 4,025,851 A | | 5/1977 | Haselwood et al. .......... 325/31 |
| 4,520,404 A | | 5/1985 | Von Kohorn ............... 358/335 |
| 4,605,973 A | | 8/1986 | Von Kohorn ............... 358/335 |
| 4,739,398 A | | 4/1988 | Thomas et al. ................ 358/84 |
| 4,835,790 A | * | 5/1989 | Yoshida et al. ............. 455/226 |
| 4,931,871 A | | 6/1990 | Kramer ....................... 358/142 |
| 4,945,412 A | | 7/1990 | Kramer ....................... 358/142 |
| 5,436,653 A | | 7/1995 | Ellis et al. ...................... 348/2 |
| 5,450,623 A | * | 9/1995 | Yokoyama et al. ....... 455/226.1 |
| 5,471,508 A | * | 11/1995 | Koslov ..................... 455/226.3 |
| 5,584,050 A | | 12/1996 | Lyons ........................ 455/67.1 |
| 5,881,368 A | * | 3/1999 | Grob et al. .................... 455/69 |
| 5,892,536 A | | 4/1999 | Logan et al. ................. 348/13 |
| 6,185,429 B1 | * | 2/2001 | Gehrke et al. .............. 455/502 |

* cited by examiner

*Primary Examiner*—Daniel Hunter
*Assistant Examiner*—Thuan T. Nguyen
(74) *Attorney, Agent, or Firm*—Van Pelt & Yi LLP (57) ABSTRACT

A system and method are disclosed for monitoring the quality of a broadcast. A broadcast signal is received at a receiver and the power of the received signal in a carrier band is measured. The power of the received signal in a sideband is also measured. A time is determined at which the ratio of the power of the received signal in the carrier band to the power of the received signal in the sideband is indicative of a carrier to noise ratio of the received signal at the receiver and the carrier to noise ratio of the received signal is stored at the receiver.

18 Claims, 7 Drawing Sheets

BROADCAST MONITORING AND CONTROL SYSTEM

FIELD OF THE INVENTION

The present invention relates generally to broadcasting a radio signal. More specifically, a system and method for monitoring broadcast quality and controlling broadcast signal power to achieve a desired signal quality is disclosed.

BACKGROUND OF THE INVENTION

Whenever a radio signal is broadcast from a transmitter to a remote receiver, the propagation of the signal can vary as a result of various atmospheric effects. Variation in signal propagation due to conditions in the ionosphere is especially significant for radio signals that are refracted from the ionosphere between the transmitter and the receiver.

In many circumstances, companies pay for a certain signal or program to be broadcast into an area. Currently, companies pay for transmission to be made but reliable methods of determining that the transmission was actually received in a given area given the propagation conditions that existed when the transmission was made are not available. Considerable work has been done to monitor broadcasts for the purpose of determining that certain content such as an advertisement that a station has been paid to air is actually aired by the station. Such work is described in U.S. Pat. Nos. 4,025,851, 4,520,404, 4,605,973, 4,739,398, 4,931,871, 4,945,412, 5,436,653, 5,584,050, and 5,892,536. For example, U.S. Pat. No. 4,931,871 describes a method for identification and verification of broadcast program segments involving use of subaudible codes that are mixed with the program segments. In general, such technology focuses on receiving a transmission and analyzing the signal received to determine whether the desired content is included in the signal.

Although work has been done to verify that content that has been paid for is included in a transmitted signal, the problem remains to determine the signal quality of the received transmission at various points within a targeted receiving area. It would be useful if an effective method of gathering data within a target area could be provided so that not only could the transmission of certain content be verified, but the quality of the reception of the content within an area of interest could also be evaluated.

For example, certain broadcasting companies such as the BBC sometimes contract for the broadcast of their signal with an independent transmitter that manages an antenna and provides a signal to the antenna. In such a case, the issue is not the content of the signal transmitted by the antenna, since the content is provided directly to the independent transmitter. The important issue to the broadcasting company is instead the quality of the reception of the signal within a specified receiving area.

In other cases, it is also of interest to know the quality of a signal that is being received in real time. Such information could be used for the purpose of controlling broadcast power while a broadcast is occurring so that only the power required to achieve a desired signal quality within a receiving area of interest is used and excessive broadcast power is not provided to the antenna. Currently, without feedback from a real time measurement of broadcast quality, a larger than required broadcast power must be used that includes extra power to insure that sufficient signal quality is achieved within the receiving area. Power is potentially wasted when signal propagation conditions are particularly good because an excess of power is broadcast to allow for the possibility that propagation conditions are not so favorable.

In some instances, such as broadcasts by the Voice of America, the signal is transmitted to an unfriendly area where it is not practical to provide a monitoring receiver for the purpose of providing broadcast quality feedback. In such a case, it would be useful if some other method of obtaining broadcast quality feedback could be derived so that the power of the signal transmitted into such an area could also be controlled according to existing propagation conditions.

What is needed, therefore, is a method of determining the quality of a signal transmitted into a receiving area both for the purpose of broadcast verification and for real time broadcast signal power control. Preferably, such a method would not necessarily require a feedback monitor located within the receiving area of interest.

SUMMARY OF THE INVENTION

A system and method for measuring the quality of a received signal in real time is disclosed. The carrier to noise ratio of a received signal is measured during pauses in the broadcast content such as would normally be expected to occur during human speech. At such times, the strength of the carrier is compared to noise in a sideband to determine the carrier to noise ratio (CNR). In one embodiment, the carrier to noise ratio measurement is synchronized with the occurrence of pauses in the broadcast content to insure that measurements of sideband noise are made when an unmodulated carrier is being broadcast. In another embodiment, a maximum carrier to noise ratio measured within a specified time interval is used to determine the carrier to noise ratio. To avoid measuring an unduly high carrier to noise ratio as a result of signal fading within a sideband, a signal ratio between the carrier and a symmetric portion of the sidebands may be measured.

It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

In one embodiment, a method of monitoring the quality of a broadcast includes receiving a broadcast signal at a receiver and measuring the power of the received signal in a carrier band. The power of the received signal in a sideband is also measured. A time is determined at which the ratio of the power of the received signal in the carrier band to the power of the received signal in the sideband is indicative of a carrier to noise ratio of the received signal at the receiver and the carrier to noise ratio of the received signal is stored at the receiver.

In one embodiment, a monitoring receiver is configured to monitor the quality of a broadcast. The monitoring receiver includes a receiving circuit configured to receive a broadcast signal. A power measurement processor is configured to measure the power of the received signal in a carrier band and in a sideband. A selecting processor is configured to determine a time at which the ratio of the power of the received signal in the carrier band to the power of the received signal in the sideband is indicative of a carrier to noise ratio of the received signal at the receiver. A memory is configured to store the carrier to noise ratio of the received signal at the receiver.

In one embodiment, a transmitter is configured to send a synchronization time to a receiver for the purpose of facilitating a signal quality measurement by the receiver. The transmitter includes a transmitting circuit configured to generate a transmission signal to be transmitted to the receiver. A processor is configured to process the transmission signal to determine the synchronization time when a substantially unmodified carrier signal is transmitted. A communication link to the receiver is configured to send the synchronization time to the receiver.

In one embodiment, a transmitter includes a monitoring receiver interface configured to receive a feedback signal from a monitoring receiver, the feedback signal being derived from a measured carrier to noise ratio at the receiver of a signal transmitted by the transmitter. A signal power processor is configured to adjust the power of the transmitted signal using a control scheme to maintain a target carrier to noise ratio at the receiver wherein the feedback signal is used as an input to the control scheme.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, details relating to technical material that is known in the technical fields related to the invention has not been described in detail in order not to unnecessarily obscure the present invention in such detail.

Figure 1:
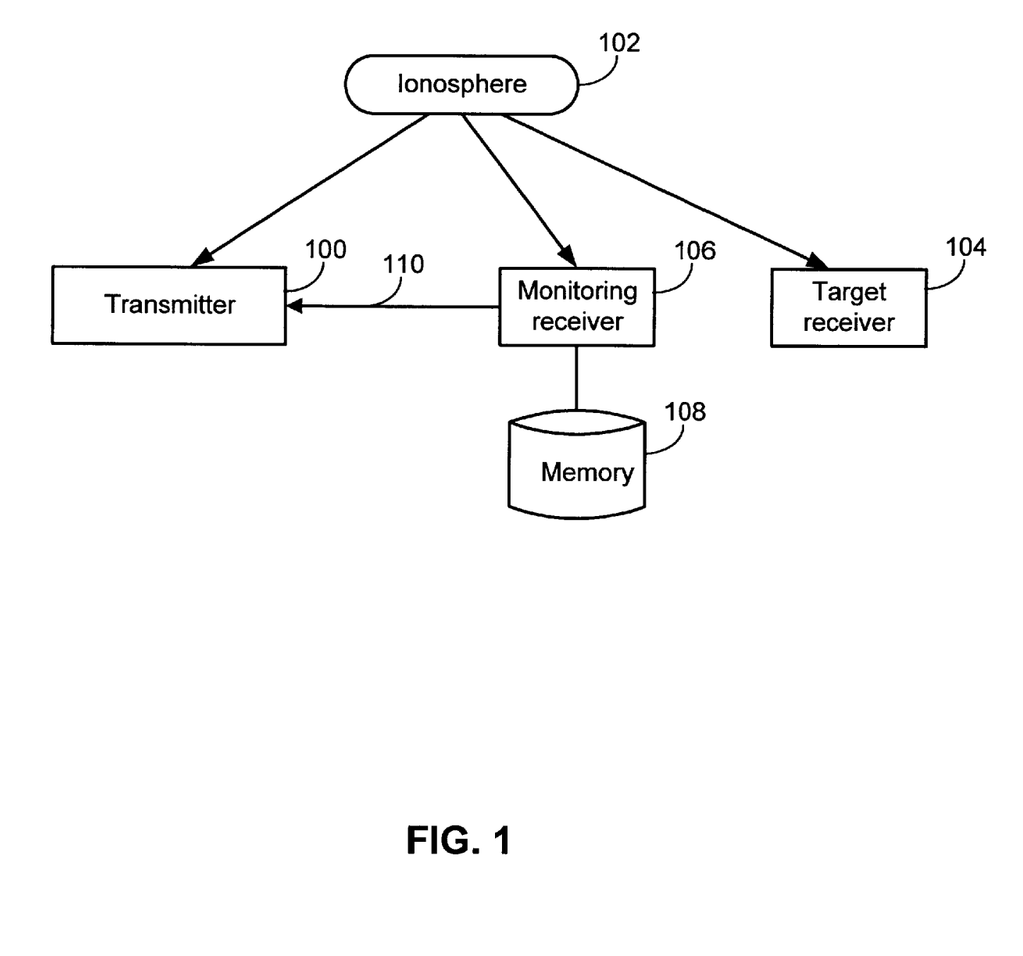
FIG. 1 is a block diagram illustrating a broadcast monitoring system used in one embodiment.

FIG. 1 is a block diagram illustrating a broadcast monitoring system used in one embodiment. A transmitter 100 transmits a signal that refracts from the ionosphere 102 and is received by a target receiver 104 that is in the receiving area of interest and is also received by a monitoring receiver 106 that is outside the area of interest. Monitoring receiver 106 may include a memory 108 that stores data collected about signals received over time by monitoring receiver 106. A communications link 110 may be established between transmitter 100 and monitoring receiver 106. Communications link 110 may be used to provide a feedback signal from monitoring receiver 106 to transmitter 100 indicating the quality of the received signal. Communications link 110 may also be used to send information from transmitter 100 to monitoring receiver 106 relating to when pauses occur in the broadcast during which monitoring receiver 106 should measure the carrier to noise ratio.

The results of measurements made by monitoring receiver 106 may be stored in memory 108 for the purpose of providing verification analysis of the signal that was received. In one embodiment a report of the measured CNR is generated as a function of time. In addition, the measured carrier to noise ratio may be provided to the transmitter in real time so that the power of the transmitter may be adjusted to transmit with less power when favorable propagation conditions allow an acceptable carrier to noise ratio to be achieved with less transmitter power.

Monitoring receiver 106 and target receiver 104 may be located at the same place and may, in some embodiments, be the same receiver. It is also possible that monitoring receiver 106 be located some distance away from target receiver 104. In such a case, the signal that reaches monitoring receiver 106 will refract from a different but nearby region of the ionosphere than the signal that is received by target receiver 104. Also, the signal received by monitoring receiver 106 may travel a different distance. An ionospheric modeling program such as is described in U.S. patent application Ser. No. 08/828,981, entitled: "Method and Apparatus for Real-Time Ionospheric Mapping and Dynamic Forecasting" may be used to estimate the difference in propagation for the different signal paths. The ionospheric modeling program and the difference in the signal path length determine an expected difference in signal attenuation between the signal path to target receiver 104 and the signal path to monitoring receiver 106. Difference in antenna gain is taken into account as well. It is then possible to use the attenuation difference to derive the CNR expected at a target receiver from a CNR calculated for a monitoring receiver that is not located in the same place as the target receiver. For example, data from a monitoring receiver in Florida may be adjusted to derive an expected CNR for a signal transmitted to Cuba from California.

Figure 2A:
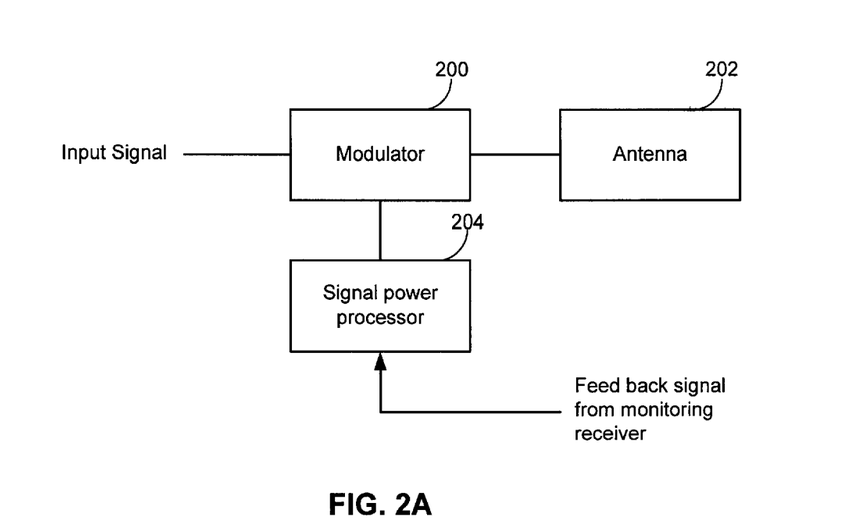
FIG. 2A is a block diagram illustrating a transmitter adapted to modify transmission power based on a feedback signal from a monitoring receiver.

FIG. 2A is a block diagram illustrating a transmitter adapted to modify transmission power based on a feedback signal from a monitoring receiver. An input signal is input to a modulator 200 that is connected to an antenna 202. A signal power processor 204 controls the output power from modulator 200 for the purpose of controlling the power of the signal output through antenna 202. It should be noted that in some embodiments, other components are included in the transmission system and the system shown is intended only as one example.

A feedback signal is input to signal power processor 204 for the purpose of adjusting the power sent to the antenna based on measured signal quality at the monitoring receiver. The feedback signal may be in the form of a carrier to noise ratio that is compared in the signal power processor to a required carrier to noise ratio. A control scheme is implemented by the signal power processor to control the power output of the antenna to achieve the desired carrier to noise ratio without outputting excessive power. Many control schemes may be used, including combinations of proportional, integral, and differential control. In some embodiments, the control scheme is implemented on the monitoring receiver and the feedback signal from the monitoring receiver is in the form of a control instruction instead of a carrier to noise ratio. In such embodiments, the monitoring receiver implements a suitable control algorithm to generate control instructions.

Figure 2B:
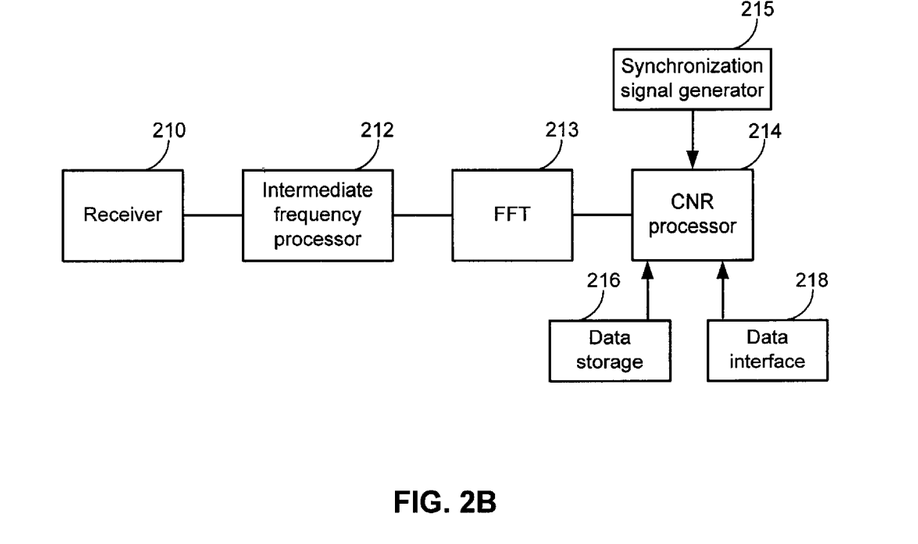
FIG. 2B is a block diagram that is a receiver that includes a processing system that determines a carrier to noise ratio of a received signal for the purpose of storing the carrier to noise ratio measurement for verification or returning the carrier to noise ratio to a transmitter for the purpose of controlling the transmission power.

FIG. 2B is a block diagram that is a receiver that includes a processing system that determines a carrier to noise ratio of a received signal for the purpose of storing the carrier to noise ratio measurement for verification or returning the carrier to noise ratio to a transmitter for the purpose of controlling the transmission power. A receiver 210 receives the signal. An intermediate frequency processor 212 converts the received signal that is modulated a high frequency carrier to a lower frequency. In one embodiment, a super heterodyne receiver converts the received signal to about a 10kHz carrier. In other embodiments, other intermediate frequencies may be used.

An FFT processor 213 computes a Fourier transform of the signal and the output of the FFT is input to a carrier to noise ratio processor 214 that determines the carrier to noise ratio of the signal. Carrier to noise ratio processor 214 may also receive an input from the synchronization signal generator that indicates when a pause in the signal has occurred and the carrier to noise ratio should be measured. The input signal may be processed at the transmitter to determine pauses in the signal when no modulation is performed on the signal and a bare carrier is sent out. Such times may be identified and transmitted to the receiver. In one embodiment, the receiver uses a clock derived from the global positioning system ("GPS") to precisely synchronize its measurement according to times provided by the transmitter.

Carrier to noise processor 214 may also continually calculate a carrier to noise ratio based on measuring the ratio of the power of the carrier across a carrier frequency band to the power of the signal in a pair of symmetric sidebands. In either case, the carrier to noise ratio determined by the processor can be stored in a data storage 216 or output by a data interface 218 to a transmitter to provide feedback for power control. In one embodiment, a general purpose computer is used to provide the processing required by the monitoring receiver. In other embodiments, dedicated processing chips are provided.

Figure 2C:
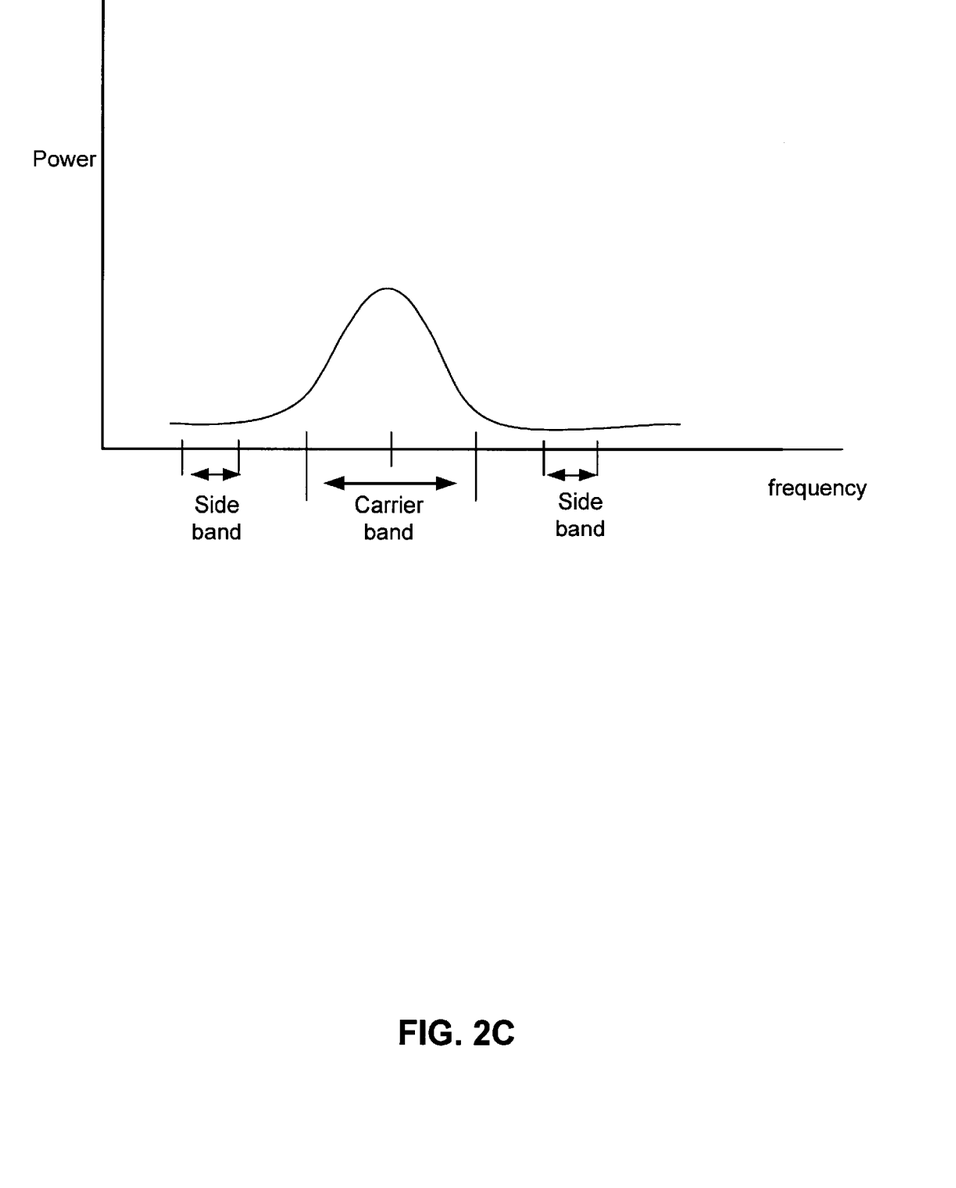
FIG. 2C is a diagram illustrating a spectrum of a received signal when a bare carrier is sent out.

FIG. 2C is a diagram illustrating a spectrum of a received signal when a bare carrier is sent out. The power integrated across a carrier band is used compared to the power measurement in two sidebands symmetrically located on the sides of the carrier band. In some embodiments, a correction is made to take into account the windowing that occurs as the result of processing the FFT. The carrier to noise ratio that the monitoring receiver measures may be affected by signal fading in one of the sidebands. To avoid generating spurious data resulting from such fading, in one embodiment, the sidebands are checked to verify that they are symmetric and non-symmetric sideband data are discarded.

Figure 3A:
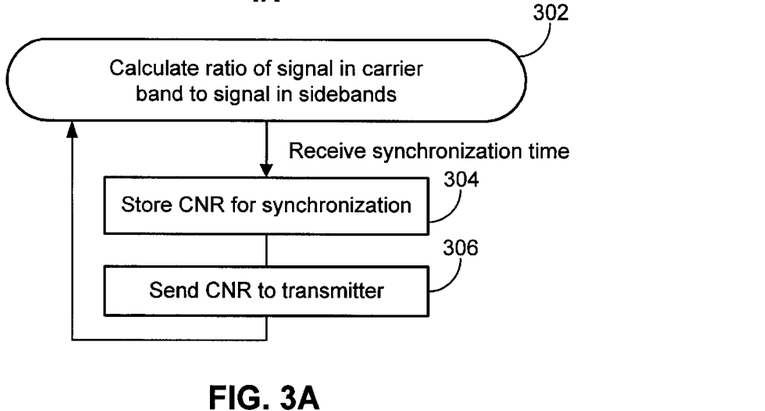
FIG. 3A is a flowchart illustrating a process implemented on a monitoring receiver in a system wherein the transmitter monitors the signal being broadcast for pauses.

FIG. 3A is a flowchart illustrating a process implemented on a monitoring receiver in a system wherein the transmitter monitors the signal being broadcast for pauses. The transmitter sends the time of such pauses to the monitoring receiver so that a carrier to noise measurement taken during such pauses can be used to evaluate the quality of the broadcast signal. The receiver repeatedly receives the signal and calculates the ratio of the signal in a carrier band to the signal in a symmetrical pair of sidebands. The carrier to sideband signal ratio is continuously stored along with a time stamp indicating when the measurement was taken. When the monitoring receiver receives a message from the transmitter indicating a synchronization time, then control is transferred to a step 304 and the carrier band to sideband signal ratio is stored as a carrier to noise ratio for the synchronization time that was specified by the transmitter. Next, in a step 306, carrier to noise ratio is sent to the transmitter for the purpose of providing feedback for controlling the transmitter power.

In different embodiments, different techniques are used for sending a synchronization time to the monitoring receiver. In one embodiment, a separate link is established with the receiver over a phone line or the Internet. In another embodiment, the synchronization time is encoded by the transmitter itself and sent in a manner that does not interfere with the main transmission. Numerous techniques exist for doing this including sending the signal in a band outside of the main transmission band, or using a spread spectrum technique.

In one embodiment, the transmitter and the monitoring receiver are synchronized by having each monitor the time signal provided by the global positioning system. Thus, when a time is specified by the transmitter, the receiver can accurately select a carrier to noise ratio measured for that exact time. This is significant because pauses in the output signal may be brief. In one embodiment, pauses are not inserted into the output signal. Instead, the signal being sent is monitored to determine naturally occurring pauses and such pauses are used as times of opportunity to measure the carrier to noise ratio. The system is particularly effective when human voice is being transmitted and naturally occurring pauses in speech afford ample opportunity for identifying such pauses and measuring the carrier to noise during their occurrences.

Figure 3B:
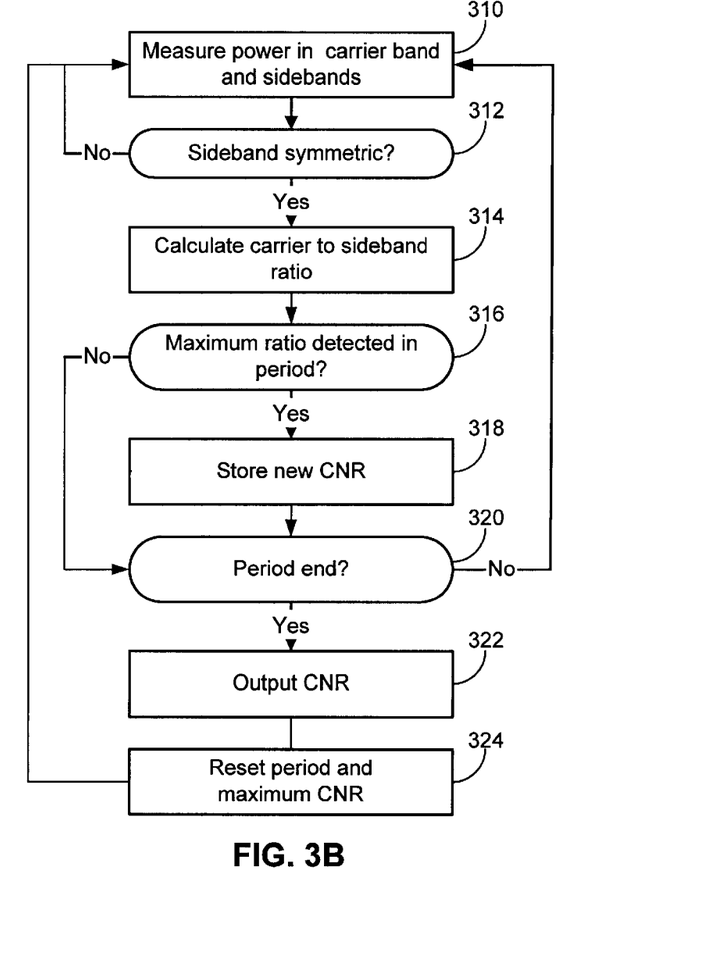
FIG. 3B is a flow chart illustrating a process implemented on a receiver that does not rely upon a synchronization signal broadcast by the transmitter to monitor the carrier to noise at a time specified by the transmitter.

FIG. 3B is a flow chart illustrating a process implemented on a receiver that does not rely upon a synchronization signal broadcast by the transmitter to monitor the carrier to noise at a time specified by the transmitter. In a step 310, the monitoring receiver measures the power in the carrier band and in sidebands that are symmetrically located in the frequencies above and below the carrier band. In a step 312, the monitoring receiver checks whether the power measured in the two sidebands is the same, that is, whether the power in the sidebands is symmetric. If the sidebands are not symmetric, then control is transferred back to 310 and the monitoring receiver continues to measure the power in the carrier band and the sidebands and to check whether the measured sidebands are symmetric. If the sidebands are determined to be symmetric within a specified symmetry condition in step 312, then control is transferred to a step 314 and the carrier to sideband ratio is calculated.

Next, in a step 316, it is determined whether the carrier to sideband ratio calculated in step 314 is the maximum carrier to sideband ratio detected within some specified period. If the newly calculated carrier to sideband ratio is the maximum carrier to sideband ratio detected in the specified period, then control is transferred to a step 318 and the newly calculated carrier to sideband ratio is stored as the new maximum carrier to sideband ratio. The maximum carrier to sideband ratio determined over a specified period determines the measured carrier to noise ratio.

If the newly calculated carrier to noise ratio is not greater than the previously determined maximum carrier to noise ratio in step 316, then control is transferred to a step 320 where it is determined whether the specified period has ended. If the period has ended, then control is transferred to a step 322 and the final maximum carrier to sideband ratio is output as the carrier to noise ratio. If the period has not ended, then control is transferred back to 310 and the receiver continues to measure the power in the carrier band and the sidebands.

Once the carrier to noise ratio is output in step 322, control is transferred to a step 324 and a new period is reset using a timer or other similar mechanism and the maximum carrier to noise ratio is reset to some initial value. Control is then transferred to step 310 and the receiver again measures carrier to sideband ratios.

Measuring signal power in symmetric sidebands is useful because one would expect sideband signals caused by noise to be approximately symmetric and sideband signals caused by modulation and possible fading to be asymmetric. By requiring a symmetric sideband signal for a carrier to noise measurement to be valid, measuring an unduly high carrier to noise ratio as a result of fading in the sidebands can be avoided. The level of symmetry required or the maximum signal difference allowed between sidebands may be relaxed to provide more qualified measurements at the cost of possibly measuring too high a CNR because of fading. When the measured CNR is used to provide feedback for the purpose of controlling transmitter power, the symmetry condition may be tightened so that transmitter power is not lowered an undue amount.

In other embodiments, the requirement that the power and the sidebands be symmetric may not be used and in some embodiments, symmetric sidebands may not be measured. However, as described above, checking that the power in the sidebands is symmetric is a very useful technique for insuring that a valid carrier to noise measurement is made, especially in a system where a synchronization signal is not provided by the transmitter.

The process described in FIG. 3B effectively determines the carrier to noise ratio of a signal that includes pauses where an unmodulated carrier is sent by the transmitter. The receiver measures the maximum carrier to sideband signal ratio during a period and the maximum carrier to sideband signal is used to approximate the CNR. The monitoring receiver does not need to rely on the identification of pauses by the transmitter. The maximum carrier to sideband signal ratio is measured during a period during which one or several pauses in the signal are expected to occur. The maximum carrier to sideband signal measured during such a period is likely to be measured during one of the pauses and is a good estimate of the carrier to noise ratio. For different signals and transmission systems, the period during which the carrier to sideband signal ratio is measured and compared to determine a maximum carrier to sideband signal is adjusted and optimized according to the characteristics of the transmitted signal. For example, a typical speech signal for a given set of transmission conditions may use a period optimized for speech, while music or other content may use a different period. In general, the period is set long enough to insure that enough measurements are made during pauses so that a reliable carrier to noise ratio is obtained. The period is adjustable in some embodiments.

Figure 4A:
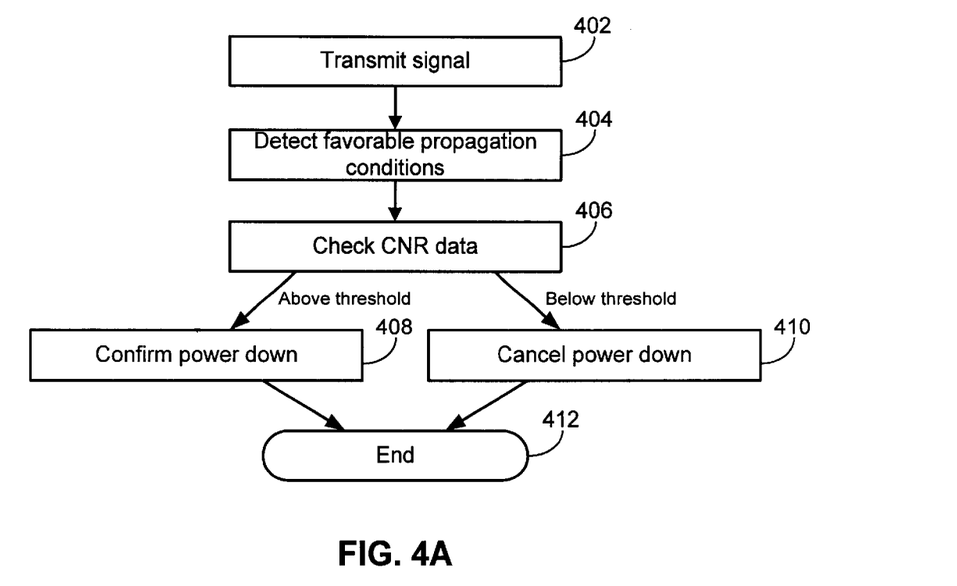
FIG. 4A is a flowchart illustrating a process for controlling the power on a transmitter that relies both on a propagation model and on feedback from a monitoring receiver to control transmittal power.

FIG. 4A is a flowchart illustrating a process for controlling the power on a transmitter that relies both on a propagation model and on feedback from a monitoring receiver to control transmittal power. In a step 402, the transmitter transmits a signal and continues to transmit without adjusting power until the transmitter detects favorable propagation conditions in a step 404. Such conditions may be detected using an atmospheric model such as the Dynacast model described in U.S. patent application Ser. No. 08/828,981, entitled "Method and Apparatus for Real-Time Ionospheric Mapping and Dynamic Forecasting," which was previously incorporated by reference.

When favorable propagation conditions are predicted by the model, control is transferred to a step 406 and the transmitter checks carrier to noise data received from the monitoring receiver to verify that the CNR at the monitoring receiver is better than a prescribed CNR and that the transmitter power can be reduced while still maintaining acceptable quality in the received signal. In one embodiment, measured carrier to noise ratios over a period of time are statistically processed to derive an average carrier to noise ratio and the average is compared to a threshold.

If the average carrier to noise ratio is above the specified threshold, then the power down is confirmed in a step 408 and the process ends at 412. If the average carrier to noise ratio is below the specified threshold, then control is transferred to a step 410. The power down requested by the propagation model is cancelled and the process ends at 412. Thus, the propagation model is combined with broadcast monitoring to detect favorable broadcast conditions and confirm that a power decrease can be made for a specific channel while maintaining acceptable signal quality. The propagation model concludes based on propagation conditions that excess power is likely being transmitted. Broadcast monitoring is then used to verify that the actual signal to noise experienced on a specific channel is high enough that a decrease in power would be appropriate. If excessive noise or interference is being experienced on the channel, then a higher power can be maintained. If a power decrease is implemented, then the broadcast monitoring system may continue to monitor the channel to make certain that the signal quality is maintained.

Figure 4B:
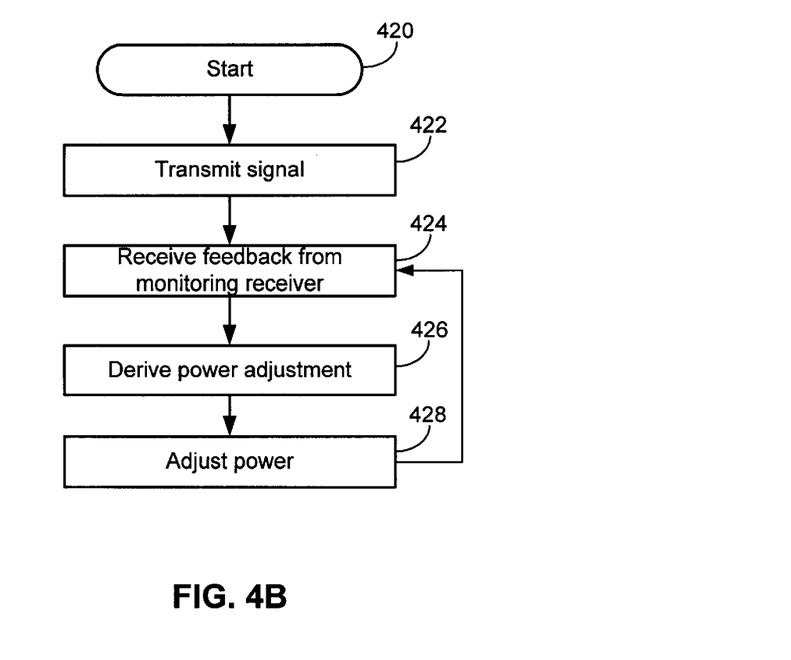
FIG. 4B is a flowchart illustrating a process implemented on a transmitter that continuously uses feedback from a monitoring receiver to control transmitter power. The process starts at 420.

FIG. 4B is a flowchart illustrating a process implemented on a transmitter that continuously uses feedback from a monitoring receiver to control transmitter power. The process starts at 420. In a step 422, the signal is transmitted. In a step 424, feedback is received from a monitoring receiver. Next, in a step 426, a power adjustment factor is derived based on the feedback. As mentioned above, the power adjustment factor may be derived from feedback received over time and various control schemes may be used to control power to achieve a desired carrier to noise ratio in a stable manner with as low transmission power as can be achieved. Next in a step 428, the transmission power is adjusted.

In some embodiments, the power is adjusted in a very coarse manner with adjustments on the order of 3 dB being the minimum possible adjustment. In such embodiments, the power adjustment algorithms take the coarseness of control into account. In other embodiments, power may be adjusted in almost a continuous manner so that very fine adjustments are possible. After the power is adjusted, control is transferred back to step 424 and further feedback from the monitoring receiver is processed.

Figure 5:
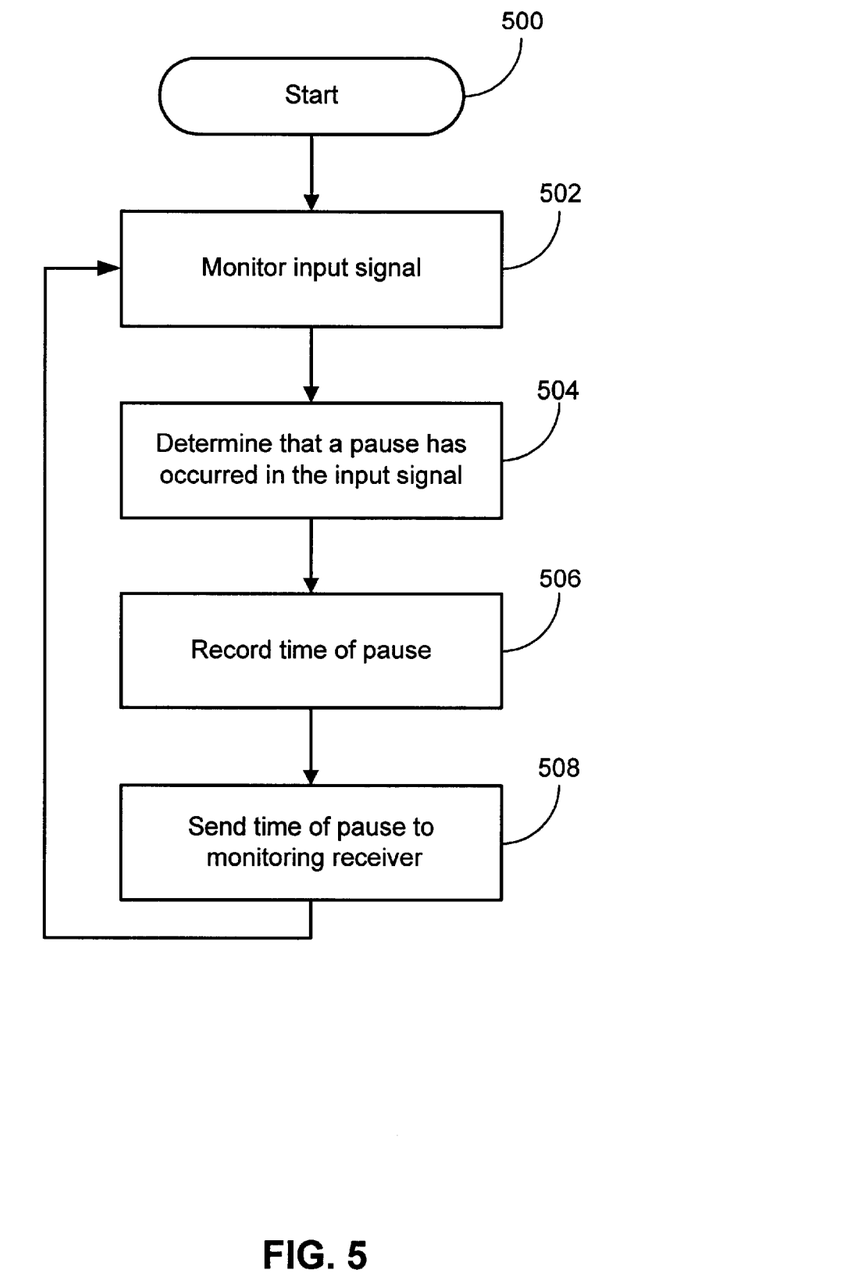
FIG. 5 is a flowchart illustrating a process implemented on a transmitter that provides a time stamp to a monitoring receiver for the purpose of identifying times when pauses in the transmitted signal occurred so that a carrier to noise ratio measurement can be stored for such times.

FIG. 5 is a flowchart illustrating a process implemented on a transmitter that provides a time stamp to a monitoring receiver for the purpose of identifying times when pauses in the transmitted signal occurred so that a carrier to noise ratio measurement can be stored for such times. The process starts at 500. In a step 502, the transmitter monitors the input signal to determine when a pause in the signal occurs. In a step 504, a pause is detected and then control is transferred to a step 506 and the time of the pause is recorded. Next, in a step 508, the time of the pause is sent to the monitoring receiver. The transmitter then continues to monitor the input signal and to detect and record pauses. In one embodiment, a list of detected pause times is periodically sent to the monitoring receiver. In another embodiment, pauses are sent upon their detection. In a system where feedback is not provided by the monitoring receiver, pauses may simply be recorded and matched with data recorded by the monitoring receiver at a later time for the purpose of determining the quality of the broadcast after the broadcast is finished.

Figure 6:
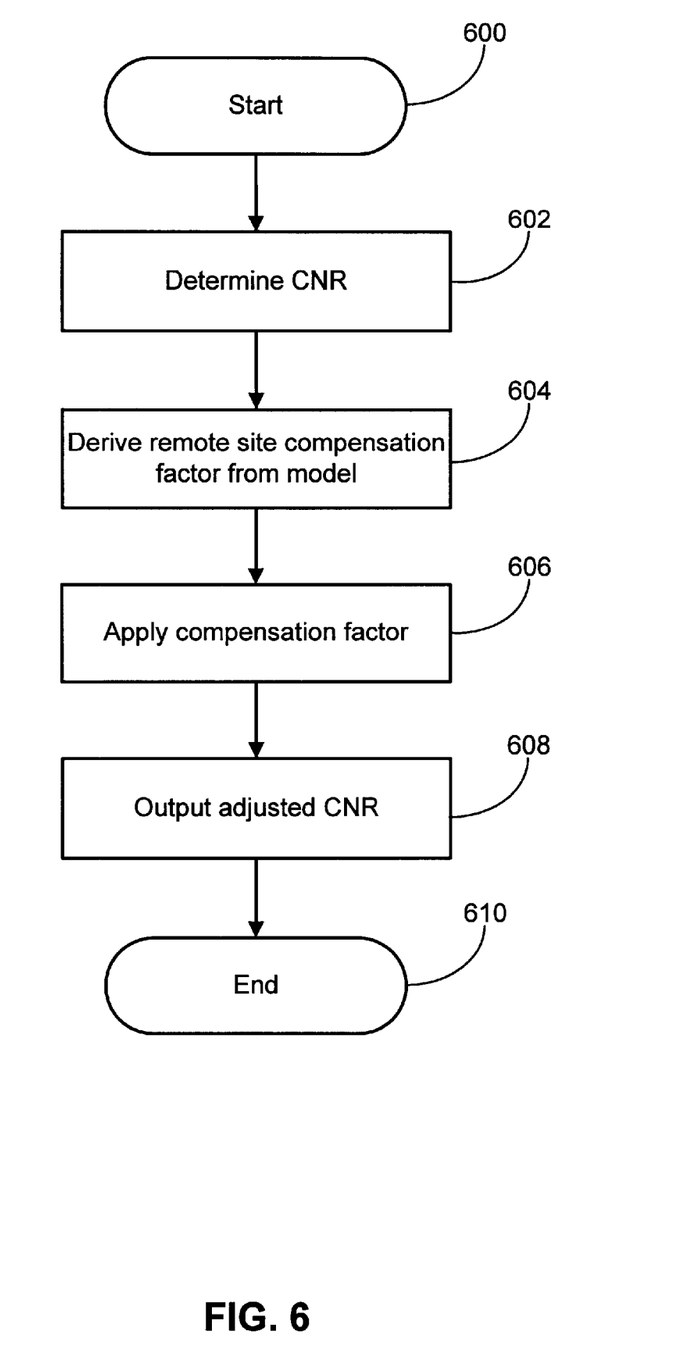
FIG. 6 is a flowchart illustrating a process implemented at a monitoring receiver that is located at a site that is remote from a receiving area of interest.

FIG. 6 is a flowchart illustrating a process implemented at a monitoring receiver that is located at a site that is remote from a receiving area of interest. The process starts at 600. In a step 602, the monitoring receiver determines a carrier to noise ratio for the signal. Next, in a step 604, the monitoring receiver derives a remote site compensation factor from a propagation model, which includes differences in antenna gain, that is used to estimate the carrier to noise ratio at a site within the area of interest. The remote site compensation factor is derived from a plurality of known effects. In one embodiment, such effects include a known antenna pattern for the transmitter, a propagation path attenuation factor derived from an ionospheric model, and a distance factor. The distance factor is derived from the difference in distance from the transmitter to the monitoring receiver and the distance from the transmitter to the receiving point being considered within the receiving area of interest. Other factors are used in other embodiments.

In a step 606, the compensation factor is applied and the adjusted carrier to noise ratio is output in a step 608. The process ends at 610. In one embodiment, the compensation factor is applied by assuming that the measured noise in the receiving area of interest is approximately the same as the measured noise in the sideband at the monitoring receiver and the carrier is suitably attenuated by an attenuation factor or in some cases enhanced by a gain factor derived from the antenna pattern, the propagation model and the difference in distance.

Thus, the monitoring receiver data may be used to derive expected carrier to noise ratios for points other than the point where the monitoring receiver is located. In some embodiments, this is used to determine received signal quality in areas where it would be impractical to locate a monitoring receiver. In other embodiments, this technique is used to create a continuous map of signal quality over a large area which is sparsely populated by monitoring receivers that sample data for the area.

A system and method for monitoring broadcast quality and providing feedback to a transmitter so that an appropriate transmission power level may be selected has been described. A carrier to noise ratio is used to estimate signal quality in one embodiment. In other embodiments, other methods of evaluating signal quality are used. The carrier to noise ratio may be derived from a maximum carrier to sideband signal ratio that is detected or may be measured at a specific time identified by the transmitter when an unmodulated carrier is sent. Measurements of carrier to noise ratios by a monitoring receiver at one location may be adjusted to provide estimates of the carrier to noise ratio at other locations.

Using a carrier to noise ratio to measure broadcast quality has been described in detail herein. It should be recognized that other measures of broadcast quality may be used as well. For example, a known signal may be embedded in the broadcast signal and the success in receiving all or a portion of the known signal may be evaluated by the monitoring receiver. Using the CNR is particularly useful and facilitates adjustments using an attenuation factor for remote points.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of monitoring the quality of a broadcast comprising:

receiving a broadcast signal at a receiver;

measuring the power of the received signal in a carrier band;

measuring the power of the received signal in a sideband;

determining a time at which the ratio of the power of the received signal in the carrier band to the power of the received signal in the sideband is indicative of a carrier to noise ratio of the received signal at the receiver; and storing the carrier to noise ratio of the received signal at the receiver.

2. A method of monitoring the quality of a broadcast as recited in claim 1 further including sending the carrier to noise ratio of the received signal at the receiver to a transmitter.

3. A method of monitoring the quality of a broadcast as recited in claim 2 wherein the carrier to noise ratio of the received signal at the receiver is used to determine an adjustment to the power of the broadcast signal that is broadcast by the transmitter.

4. A method of monitoring the quality of a broadcast as recited in claim 2 wherein the power of the broadcast signal that is broadcast by the transmitter is controlled using a control scheme to maintain a target carrier to noise ration at the receiver and the measured carrier to noise ratio of the received signal at the receiver is used as an input to the control scheme.

5. A method of monitoring the quality of a broadcast as recited in claim 1 further including generating a report indicating the carrier to noise ratio of the received signal at the receiver as a function of time.

6. A method of monitoring the quality of a broadcast as recited in claim 1 wherein the broadcast signal refracts from the ionosphere before being received.

7. A method of monitoring the quality of a broadcast as recited in claim 1 wherein determining a time at which the ratio of the power of the received signal in the carrier band to the power of the received signal in the sideband is indicative of a carrier to noise ratio of the received signal includes:

receiving a synchronization signal from a transmitter wherein the synchronization signal indicates a specified time at which the received signal substantially corresponds to an unmodulated carrier; and     selecting the ratio of the power of the received signal in the carrier band to the power of the received signal in the sideband measured at the specified time as the carrier to noise ratio of the received signal.

8. A method of monitoring the quality of a broadcast as recited in claim 7 wherein the synchronization time corresponds to a naturally occurring pause in broadcast speech.

9. A method of monitoring the quality of a broadcast as recited in claim 1 wherein determining a time at which the ratio of the power of the received signal in the carrier band to the power of the received signal in the sideband is indicative of a carrier to noise ratio of the received signal includes determining a maximum carrier to sideband signal to noise ratio over a period of time and designating the maximum carrier to sideband signal to noise ratio as the carrier to noise ratio.

10. A method of monitoring the quality of a broadcast as recited in claim 1 wherein the broadcast signal has a carrier frequency and measuring the power of the received signal in a sideband includes measuring the power in a symmetric sideband comprising a two bands symmetrically selected at frequencies above and below the carrier frequency.

11. A method of monitoring the quality of a broadcast as recited in claim 10 further including determining whether power measured in the two symmetric bands is substantially equal and discarding the measurement of the power of the received signal in the sideband if the power measured in the two symmetric bands is not substantially equal.

12. A method of monitoring the quality of a broadcast as recited in claim 1 wherein the received signal is converted to a lower frequency before measuring the power of the received signal in the carrier band and the sideband.

13. A method of monitoring the quality of a broadcast as recited in claim 1 further including adjusting the measured carrier to noise ratio at the receiver to correspond to an expected carrier to noise ratio at a location that is remote from the receiver.

14. A method of monitoring the quality of a broadcast as recited in claim 13 wherein adjusting the measured carrier to noise ratio at the receiver includes using an ionospheric model to determine an attenuation factor to correct for different characteristics of a first signal path between the receiver and a transmitter and the receiver and a second signal path between the location that is remote from the receiver and the transmitter.

15. A method of monitoring the quality of a broadcast as recited in claim 13 wherein adjusting the measured carrier to noise ratio at the receiver includes using an ionospheric model to determine a gain factor to correct for different characteristics of a first signal path between the receiver and a transmitter and the receiver and a second signal path between the location that is remote from the receiver and the transmitter.

16. A method of monitoring the quality of a broadcast as recited in claim 13 wherein adjusting the measured carrier to noise ratio at the receiver includes using an antenna model to determine an antenna gain factor to correct for different antenna gains at the receiver location and the location that is remote from the receiver and the transmitter.

17. A monitoring receiver configured to monitor the quality of a broadcast comprising:

a receiving circuit configured to receive a broadcast signal;

a power measurement processor configured to measure the power of the received signal in a carrier band and in a sideband;

a selecting processor configured to determine a time at which the ratio of the power of the received signal in the carrier band to the power of the received signal in the sideband is indicative of a carrier to noise ratio of the received signal at the receiver; and     a memory configured to store the carrier to noise ratio of the received signal at the receiver.

18. A monitoring receiver as recited in claim 17 wherein the power measurement processor and the selecting processor are implemented on a single processor.

\* \* \* \* \*